UNITED STATES PATENT OFFICE.

JAMES F. WASHINGTON, OF CHICAGO, ILLINOIS.

CLEANING COMPOSITION.

No. 891,646.   Specification of Letters Patent.   Patented June 23, 1908.

Application filed November 30, 1906.  Serial No. 345,669.

*To all whom it may concern:*

Be it known that I, JAMES F. WASHINGTON, a citizen of the United States, residing at Chicago, in the county of Cook and State of Illinois, have invented certain new and useful Improvements in Cleaning Compositions, of which the following is a specification.

This invention relates to cleaning compositions, and has reference more particularly to a novel composition of matter designed to be applied to clay and earthenware products, such as brick, tile, mortar, etc., to prevent or remove the unsightly stains that frequently form thereon owing to the exudation or efflorescence of alkaline substances, such as saltpeter, on the surface thereof. This phenomenon is especially common on brick walls that are exposed to wide variations in atmospheric conditions, and often produces a serious disfigurement in architecturally artistic structures; the same phenomenon also appearing sometimes on the plastered walls of dwellings, and the like.

My improved composition comprises as its ingredients the four substances known as (1) raw linseed oil; (2) Venice turpentine; (3) mercurous chlorid or calomel; and (4) sodium chlorid or common salt.

In preparing my composition I take, as a sample batch, one gallon of raw linseed oil, seven ounces of Venice turpentine, three ounces of calomel, and four ounces of common salt. These ingredients are brought together and thoroughly mixed.

The composition may be used both as a preventive and as a cure. For instance, bricks or tile may be immersed in the composition and allowed to absorb the same, which prevents the subsequent appearance of the efflorescence referred to. Or, when the efflorescence has already appeared, the composition may be applied over the surface with an ordinary brush or sponge and soon causes its disappearance. Plastered walls may be similarly treated to remove the alkaline stains. Of the several ingredients, the oil furnishes the body of the composition, and also serves as a spreader or thinner for the thick, gummy Venice turpentine, which latter serves to seal the pores of the brick or other substance treated. The calomel is the active agent in destroying or preventing the appearance of the saltpeter or kindred alkali that forms the efflorescence or stains, and the salt promotes and facilitates the action of the calomel by retarding the natural drying action of the composition. I have found that mercuric chlorid, commonly known as corrosive sublimate, may be substituted in the composition for the calomel and salt with substantially the same results.

The exact relative proportions of the ingredients as above named are not of the essence of the invention, but may be varied somewhat and still secure the result sought by the invention; but for general purposes I prefer to employ the ingredients in the proportions specified.

I claim:

1. A composition for preventing and removing alkaline efflorescence from bricks and the like, formed by mixing together raw linseed oil, Venice turpentine, calomel, and common salt.

2. A composition for preventing and removing alkaline efflorescence from bricks and the like, formed by mixing the following ingredients in substantially the following specified proportions, to wit: one gallon of raw linseed oil, seven ounces of Venice turpentine, three ounces of calomel, and four ounces of common salt.

JAMES F. WASHINGTON.

Witnesses:
GEORGE E. HALEY,
SAMUEL N. POND.